US00RE47829E

(19) United States
(12) Reissued Patent
Saito et al.

(10) Patent Number: US RE47,829 E
(45) **Date of Reissued Patent: *Jan. 28, 2020**

(54) IMAGE FORMING APPARATUS AND LIGHT GUIDE MEMBER

(71) Applicant: KYOCERA Document Solutions Inc., Osaka-shi, Osaka (JP)

(72) Inventors: Yosuke Saito, Osaka (JP); Hironobu Oi, Osaka (JP); Jun Nakai, Osaka (JP); Yoshinori Nakamura, Osaka (JP)

(73) Assignee: KYOCERA Document Solutions Inc., Osaka-shi, Osaka (JP)

( * ) Notice: This patent is subject to a terminal disclaimer.

(21) Appl. No.: 15/905,476

(22) Filed: Feb. 26, 2018

Related U.S. Patent Documents

Reissue of:
(64) Patent No.: 9,471,026
Issued: Oct. 18, 2016
Appl. No.: 14/946,650
Filed: Nov. 19, 2015

(30) Foreign Application Priority Data

Nov. 21, 2014 (JP) ..... 2014-236153

(51) Int. Cl.
*G03G 21/00* (2006.01)
*G03G 21/08* (2006.01)

(52) U.S. Cl.
CPC ..... *G03G 21/08* (2013.01)

(58) Field of Classification Search
CPC ..... G03G 21/08
See application file for complete search history.

(56) References Cited

U.S. PATENT DOCUMENTS 5,631,994 A * 5/1997 Appeldom ..... G02B 6/001 385/147
6,052,135 A * 4/2000 Ender ..... G03G 15/755 347/116
8,903,285 B2 * 12/2014 Hatano ..... G03G 15/0189 399/128
9,354,561 B1 * 5/2016 Oi ..... G03G 21/00
(Continued)

FOREIGN PATENT DOCUMENTS

JP 59228683 A * 12/1984
JP 2003005535 A 1/2003
(Continued)

*Primary Examiner* — Deandra M Hughes
(74) *Attorney, Agent, or Firm* — Alleman Hall Creasman & Tuttle LLP

(57) ABSTRACT

A light guide member has a transmitting/reflecting portion transmitting and reflecting light that is emitted from a light source, to enter one end of the light guide member in a longitudinal direction, and be guided to the other end of the light guide member so that the light is applied to: a position between the developing roller and the transfer roller on the image carrier on a downstream side in the traveling direction of the transfer target member; and a position between the transfer roller and the cleaning portion on the image carrier on an upstream side in the traveling direction of the transfer target member. Furthermore, the light guide member has a convex portion having an arc-shaped cross section and being formed outward at a position opposing the transmitting/reflecting portion in a part of a predetermined specific region at one end or both ends in the longitudinal direction.

12 Claims, 3 Drawing Sheets

(56) References Cited

U.S. PATENT DOCUMENTS

| | | | | |
|---|---|---|---|---|
| 2004/0005170 | A1* | 1/2004 | Ahn | G03G 21/00 399/128 |
| 2004/0071436 | A1* | 4/2004 | Kwon | G02B 6/0038 385/146 |
| 2006/0001731 | A1* | 1/2006 | Nakamura | B41J 2/451 347/225 |
| 2008/0159783 | A1* | 7/2008 | Jung | G03G 15/169 399/128 |
| 2009/0097880 | A1* | 4/2009 | Kawahara | G03G 15/043 399/128 |
| 2009/0324286 | A1* | 12/2009 | Okabe | G03G 21/08 399/128 |
| 2010/0183333 | A1* | 7/2010 | Kim | G02B 6/001 399/168 |
| 2011/0249987 | A1 | 10/2011 | Ishino et al. | |
| 2013/0136499 | A1 | 5/2013 | Kamiyama | G03G 21/08 399/128 |
| 2013/0195507 | A1* | 8/2013 | Morishita | G03G 15/169 399/128 |
| 2014/0029964 | A1* | 1/2014 | Shibuya | G03G 15/0131 399/44 |

FOREIGN PATENT DOCUMENTS

| | | | | |
|---|---|---|---|---|
| JP | 2003295717 | A | 10/2003 | |
| JP | 2011221405 | A | 11/2011 | |
| JP | 2013113901 | A * | 6/2013 | G03G 21/08 |
| JP | 2015094836 | A * | 5/2015 | G03G 21/08 |

* cited by examiner

IMAGE FORMING APPARATUS AND LIGHT GUIDE MEMBER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

INCORPORATION BY REFERENCE

This application is based upon and claims the benefit of priority from the corresponding Japanese Patent Application No. 2014-236153 filed on Nov. 21, 2014, the entire contents of which are incorporated herein by reference.

BACKGROUND

The present disclosure relates to an electrophotographic image forming apparatus and a light guide member used in the electrophotographic image forming apparatus.

In an electrophotographic image forming apparatus, a photosensitive drum is uniformly charged by a charging roller. Next, laser light is applied to a surface of the charged photosensitive drum, and thus an electrostatic latent image is formed on the surface of the photosensitive drum. Then, the electrostatic latent image on the photosensitive drum is developed by using toner. Then, after the toner image on the photosensitive drum is transferred onto a transfer target member such as a sheet or an intermediate transfer belt, the photosensitive drum is discharged by discharging light emitted from a discharging portion, and the surface of the photosensitive drum is cleaned by a cleaning portion.

In some cases, a discharging portion, which applies discharging light to the photosensitive drum before transfer of the toner image on the photosensitive drum onto the transfer target member, is provided. Furthermore, an arrangement is known in which light emitted from a light source is reflected, by a light guide member having two reflection surfaces, toward: a position at which a toner image has been transferred and which is a position of a photosensitive drum on an upstream side in a traveling direction of the transfer target member; and a position at which a toner image has not been transferred and which is a position of a photosensitive drum on a downstream side in the traveling direction of the transfer target member.

SUMMARY

An image forming apparatus according to one aspect of the present disclosure includes: a plurality of image carriers; a developing roller; a transfer roller; a cleaning portion; a light source; and a light guide member. The image carriers are arranged along a traveling direction of a transfer target member. The developing roller develops an electrostatic latent image formed on each image carrier as an toner image. The transfer roller transfers the toner image formed on each image carrier onto the transfer target member. The cleaning portion cleans each image carrier after the toner image is transferred onto the transfer target member by the transfer roller. The light source emits light used to discharge each image carrier. The light guide member has a transmitting/reflecting portion transmitting and reflecting light that is emitted from the light source, to enter one end of the light guide member in a longitudinal direction, and be guided to the other end of the light guide member so that the light is applied to: a position between the developing roller and the transfer roller on the image carrier on a downstream side in the traveling direction of the transfer target member; and a position between the transfer roller and the cleaning portion on the image carrier on an upstream side in the traveling direction of the transfer target member. Furthermore, the light guide member has a convex portion having an arc-shaped cross section and being formed outward at a position opposing the transmitting/reflecting portion in a part of a predetermined specific region at one end or both ends in the longitudinal direction.

A light guide member according to another aspect of the present disclosure is an elongated member used in an image forming apparatus including: a plurality of image carriers arranged along a traveling direction of a transfer target member; a developing roller configured to develop an electrostatic latent image formed on each image carrier as a toner image; a transfer roller configured to transfer the toner image formed on each image carrier onto the transfer target member; a cleaning portion configured to clean each image carrier after the toner image is transferred onto the transfer target member by the transfer roller; and a light source configured to emit light used to discharge each image carrier. The light guide member has a transmitting/reflecting portion and a convex portion, the transmitting/reflecting portion transmitting and reflecting light that is emitted from the light source, to enter one end of the light guide member in a longitudinal direction, and be guided to the other end of the light guide member so that the light is applied to: a position between the developing roller and the transfer roller on the image carrier on a downstream side in the traveling direction of the transfer target member; and a position between the transfer roller and the cleaning portion on the image carrier on an upstream side in the traveling direction of the transfer target member, the convex portion having an arc-shaped cross section and being formed outward at a position opposing the transmitting/reflecting portion in a part of a predetermined specific region at one end or both ends in the longitudinal direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, for understanding of the present disclosure, an embodiment of the present disclosure will be described based on the drawings. Note that the embodiment below is a specific exampe of the present disclosure and does not limit the technical scope of the present disclosure.

Figure 1:
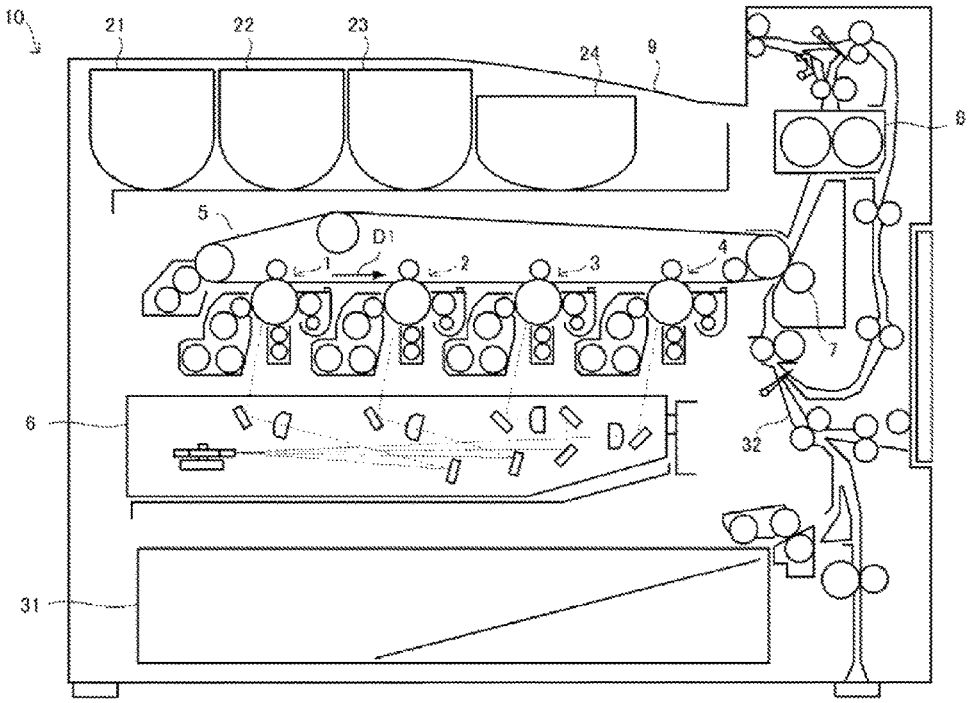
FIG. 1 is a diagram illustrating a configuration of an image forming apparatus according to an embodiment of the present disclosure.

As iustrated in FIG. 1, an image forming apparatus 10 includes a plurality of image forming units 1 to 4, an intermediate transfer belt 5, a laser scanning unit 6, a secondary transfer roller 7, a fixing device 8, a sheet discharge tray 9, toner containers 21 to 24, a sheet feeding cassette 31, and a conveyance path 32. The image forming apparatus 10 is a color printer that forms a color image or a monochrome image based on image data inputted from an information processing apparatus such as a personal computer on a sheet supplied along the conveyance path 32 from the sheet feeding cassette 31.

The image forming units 1 to 4 are arranged along a traveling direction D1 of the intermediate transfer belt 5 and constitute a so-called tandem type image forming portion. Specifically, the image forming unit 1 forms a Y (yellow) toner image, the image forming unit 2 forms an M (magenta) toner image, the image forming unit 3 forms a C (cyan) toner image, and the image forming unit 4 forms a K (black) toner image. In the present embodiment, the intermediate transfer belt 5 is described as an example of a transfer target member, but a sheet such as a printing sheet may be an example of a transfer target member. That is, an arrangement in which a toner image is transferred onto a sheet conveyed by a sheet conveyor belt is possible as another embodiment.

Figure 2:
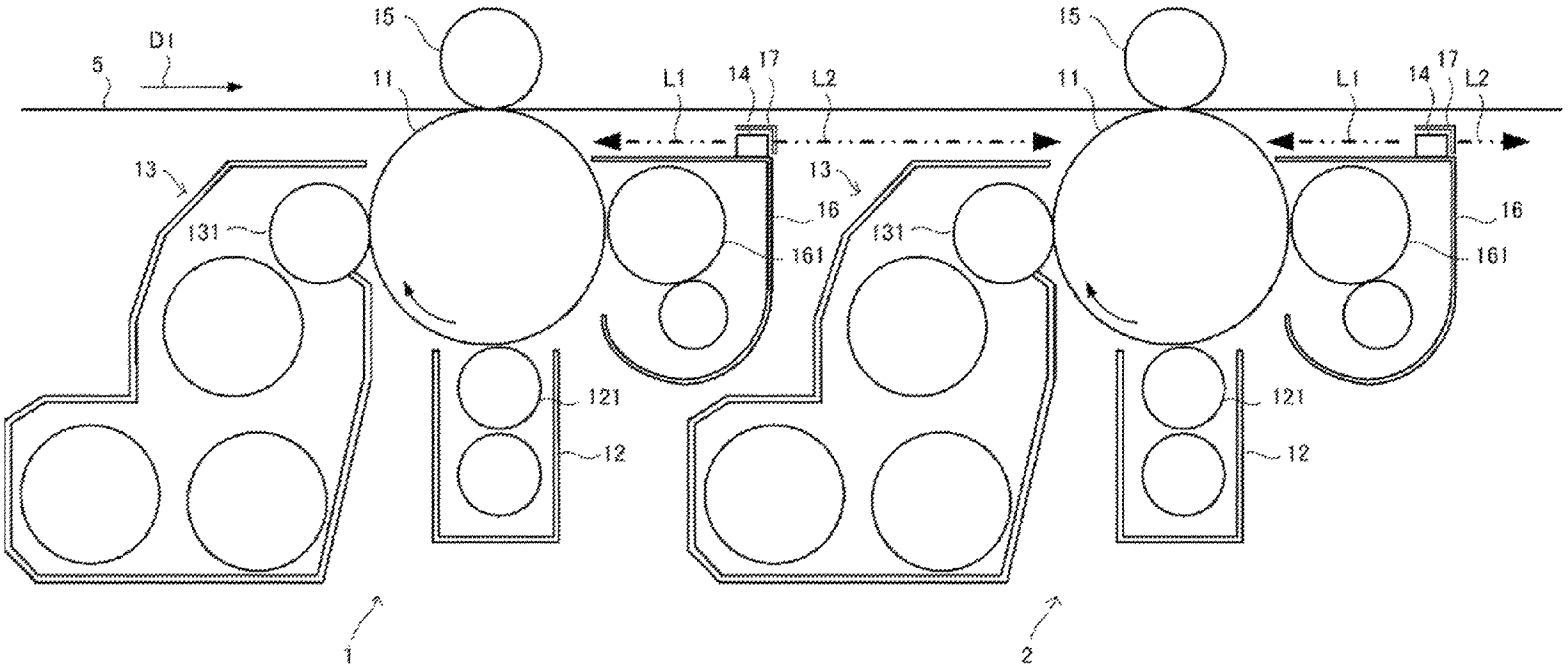
FIG. 2 is a diagram illustrating an example of image forming units of the image forming apparatus illustrated in FIG. 1.

As illustrated in FIG. 2, the image forming unit 1 and the image forming unit 2 are electrophotographic image forming units each including a photosensitive drum 11, and a charging portion 12, a developing portion 13, a discharging portion 14, a primary transfer roller 15, and a cleaning device 16 that correspond to the photosensitive drum 11. Note that the image forming unit 3 and the image forming unit 4 have a similar configuration, and therefore description thereof is omitted.

Each of the photosensitive drums 11 is arranged along the traveling direction of the intermediate transfer belt 5 and is an image carrier that carries an electrostatic latent image and a toner image. Each of the charging portions 12 has a charging roller 121 that charges the photosensitive drum 11 by electric power supplied from a power source (not shown). Next, laser light by the laser scanning unit 6 is applied to the photosensitive drum 11 charged by the charging portion 12, and thus an electrostatic latent image based on image data is formed on an outer peripheral surface of the photosensitive drum 11. Each of the developing portions 13 has a developing roller 131 that develops the electrostatic latent image formed on the photosensitive drum 11 by using toner (developer). Note that an external additive such as a lubricating agent or a polishing agent is used together with toner to develop the electrostatic latent image by the developing portion 13. Toner is supplied from the detachable toner containers 21 to 24 corresponding to the respective colors to the respective developing portions 13.

Each of the primary transfer rollers 15 transfers the toner image formed on the photosensitive drum 11 onto the intermediate transfer belt 5. The intermediate transfer belt 5 is an intermediate transfer member that travels on the photosensitive drums 11 of the respective image forming units 1 to 4 and on which toner images of the respective colors formed on the respective photosensitive drums 11 are sequentially transferred so as to overlap each other. Then, the toner image on the intermediate transfer belts 5 is transferred onto a sheet conveyed via the conveyance path 32 from the sheet feeding cassette 31 by the secondary transfer roller 7. Then, the toner image transferred onto the sheet is heated by the fixing device 8 so as to be fused and fixed on the sheet. Each of the cleaning devices 16 has a cleaning portion 161 such as a cleaning roller or a cleaning blade that cleans the photosensitive drum 11 after the toner image is transferred onto the intermediate transfer belt 5 by the primary transfer roller 15.

Each of the discharging portions 14 applies discharging light L1 for discharging the photosensitive drum 11 to a position between the primary transfer roller 15 and the cleaning portion 161 on an outer peripheral surface of the photosensitive drum 11 on an upstream side of the traveling direction D1 of the intermediate transfer belt 5. In other words, each of the discharging portions 14 applies the discharging light L1 to a position that is, in a rotation direction of the photosensitive drum 11, on a downstream side of the primary transfer roller 15 and on an upstream side of the cleaning portion 161. Furthermore, each of the discharging portions 14 applies discharging light L2 for discharging the photosensitive drum 11 to a position between the developing roller 131 and the primary transfer roller 15 on an outer peripheral surface of the photosensitive drum 11 on a downstream side of the traveling direction D1 of the intermediate transfer belt 5. In other words, each of the discharging portions 14 applies the discharging light L2 to a position that is, in the rotation direction of the photosensitive drum 11, on a downstream side of the developing roller 131 and on an upstream side of the primary transfer roller 15. A so-called memory image of the photosensitive drum 11 is suppressed by discharging the photosensitive drum 11 before and after transfer of the toner image of the photosensitive drum 11 onto the intermediate transfer belt 5.

Since a yellow image is not noticeable, the problem of occurrence of an image memory hardly become evident even if the discharging light L2 is not applied to the photosensitive drum 11 of the image forming unit 1 that corresponds to yellow. Therefore, in the image forming apparatus 10, a discharging portion 14 that applies discharging light L2 to the photosensitive drum 11 of the image forming unit 1 is omitted. That is, in the image forming apparatus 10, the photosensitive drum 11 disposed on the most upstream side of the traveling direction D1 is one that corresponds to yellow, and the discharging portion 14 including a light source 141 and a light guide member 142 is disposed only at positions on the downstream side of the respective photosensitive drums 11 in the traveling direction D1. Needless to say, it is possible to employ an arrangement in which the image forming apparatus 10 includes a discharging portion 14 that applies the discharging light L2 to the photosensitive drum 11 of the image forming unit 1.

Figure 3:
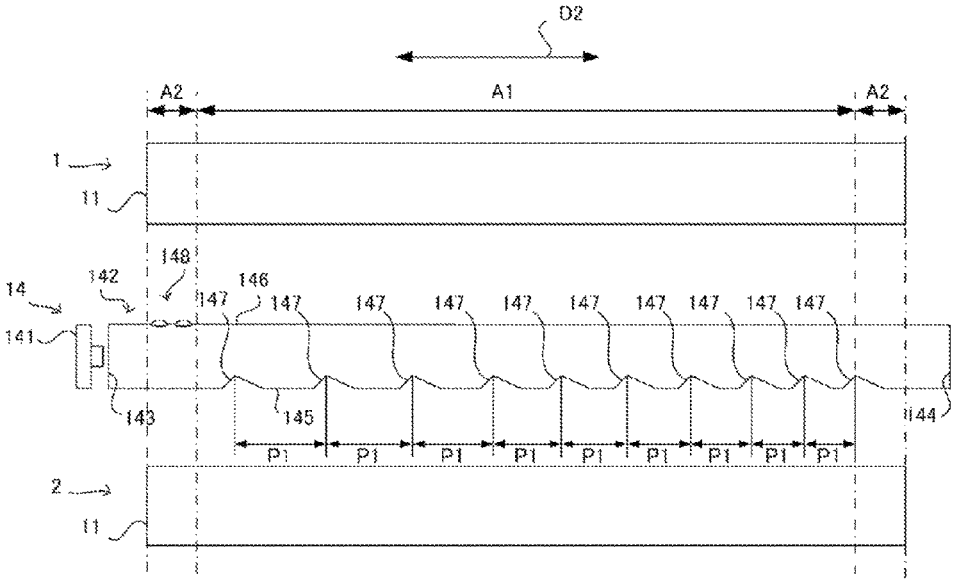
FIG. 3 is a diagram illustrating a discharging portion of the image forming unit illustrated in FIG. 2.
Figure 4:
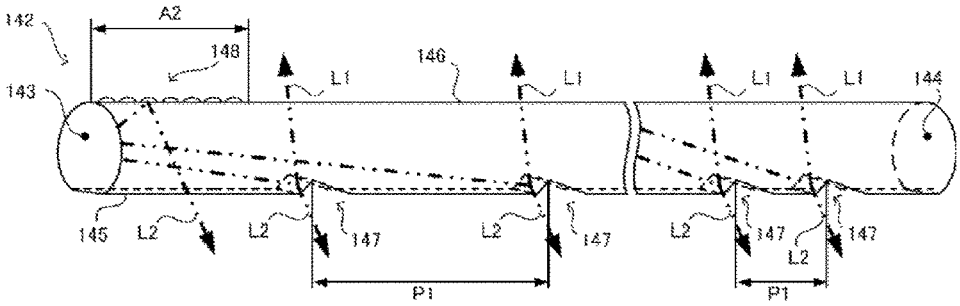
FIG. 4 is a diagram illustrating a light guide member of the discharging portion illustrated in FIG. 3.

Next, the discharging portion 14 is described with reference to FIGS. 3 and 4.

The discharging portion 14 is disposed between the photosensitive drum 11 disposed on the upstream side in the traveling direction D1 of the intermediate transfer belt 5 and the photosensitive drum 11 disposed on the downstream side in the traveling direction D1 of the intermediate transfer belt 5. The discharging portion 14 has the light source 141 and the light guide member 142 elongated in an axial direction D2 of the photosensitive drum 11. The light guide member 142 is longer than the photosensitive drum 11, and the longitudinal direction of the light guide member 142 is parallel with the axial direction D2 of the photosensitive drum 11.

The light source 141 is, for example, an LED light source that emits light for discharging the photosensitive drum 11. The light emitted from the light source 141 enters a light incident surface 143 formed at one end of the light guide member 142 in the longitudinal direction. In the light guide member 142, the light that enters from the one end at which the light incident surface 143 is formed is guided toward an end surface 144 at the other end while being repeatedly reflected. In the present embodiment, a case where the light source 141 is provided at one end of the light guide member 142 is described as an example. However, an arrangement in which the light source 141 is provided at both ends of the light guide member 142 and light enters from both of the light incident surface 143 and the end surface 144 is also possible as another embodiment.

The light guide member 142 is a substantially cylindrical shaped member whose cross section has a D-shape (semicircular shape) and that has a flat surface 145 and a curved surface 146 and is, for example, made of a material such as a resin.

A plurality of transmitting/reflecting portions 147 are formed on the flat surface 145 at predetermined intervals in the longitudinal direction.

Specifically, the transmitting/reflecting portions 147 are inclined surfaces formed inwardly from the flat surface 145 at a predetermined inclination angle. The inclination angle of the transmitting/reflecting portions 147 is appropriately determined so that the amount of transmission and the amount of reflection of the light emitted from the light source 141 in the transmitting/reflecting portions 147 have a predetermined relationship. For example, the inclination angle of the transmitting/reflecting portions 147 is determined so that a ratio of the amount of discharging light L1 that reaches the photosensitive drum 11 on the upstream side in the traveling direction D1 of the intermediate transfer belt 5 and the amount of discharging light L2 that reaches the photosensitive drum 11 on the downstream side in the traveling direction D1 of the intermediate transfer belt 5 becomes 1:10.

In the discharging portion 14, the light emitted from the light source 141 is reflected by the transmitting/reflecting portions 147. This causes the light to be applied as the discharging light L1 for discharging the photosensitive drum 11 to the position between the primary transfer roller 15 and the cleaning device 16 on the outer peripheral surface of the photosensitive drum 11 on the upstream side in the traveling direction D1 of the intermediate transfer belt 5.

In the discharging portion 14, the light emitted from the light source 141 passes through the transmitting/reflecting portions 147. This causes the light to be applied as the discharging light L2 for discharging the photosensitive drum 11 to the position between the developing roller 131 and the primary transfer roller 15 on the outer peripheral surface of the photosensitive drum 11 on the downstream side in the traveling direction D1 of the intermediate transfer belt 5.

Meanwhile, the arrangement in which a light guide member has two reflection surfaces as in the related art described above has a problem that the shape of a metal mold for formaion of the light guide member becomes complicated. However, the image forming apparatus 10 makes it possible to simplify the shape of a metal mold for molding the light guide member 142 since only the one flat surface 145 having the transmitting/reflecting portions 147 is formed in the light guide member 142.

Note that the light guide member 142 may be roated by 180 degrees. That is, the discharging portion 14 may be arranged such that the light emitted from the light source 141 is reflected by the transmitting/reflecting portions 147 so as to be applied as the discharging light L2 to the position between the developing roller 131 and the primary transfer roller 15 on the outer peripheral surface of the photosensitive drum 11 on the downstream side in the traveling direction D1 of the intermediate transfer belt 5. In this case, the discharging portion 14 is arranged such that the light emitted from the light source 141 passes through the transmitting/reflecting portions 147 so as to be applied as the discharging light L1 to the position between the primary transfer roller 15 and the cleaning device 16 on the outer peripheral surface of the photosensitive drum 11 on the upstream side in the traveling direction D1 of the intermediate transfer belt 5.

In the light guide member 142, the amount of light gradually declines while the light incident from the light source 141 is guided from one end to the other end. Accordingly, in the light guide member 142, intervals P1 at which the transmitting/reflecting portions 147 are formed in the longitudinal direction become shorter as the distance from the light source 141 becomes longer. This increases the amount of reflection and the amount of transmission of the light by the transmitting/reflecting portions 147 at positions far from the light incident surface 143 of the light guide member 142, thereby achieving uniformity of the discharging light L1 and the discharging light L2 in the longitudinal direction of the light guide member 142. Furthermore, an arrangement in which the sizes of the transmitting/reflecting portions 147 become larger as the distance from the light source 141 becomes longer may be employed as an arrangement for achieving uniformity of the discharging light L1 and the discharging light L2 emitted from the light guide member 142.

In a case where the amount of discharging light that is applied from the vicinity of the end of the light guide member 142 on the light source 141 side to an image formation region A1 of the photosensitive drum 11 on the downstream side in the traveling direction D1 of the intermediate transfer belt 5 is insufficient, there is a risk of inhibiting uniformity of the discharging light. Specifically, in the light guide member 142, the discharging light L2 that has passed through the transmitting/reflecting portions 147 is applied to the photosensitive drum 11 at a certain angle. This may undesirably cause the amount of light to be applied to an end portion of the image formation region A1 of the photosensitive drum 11 to be smaller than that in the other region.

Furthermore, in a case where discharging light of a high intensity is applied from the vicinity of the end of the light guide member 142 on the light source 141 side to the image formation region A1 of the photosensitive drum 11 on the upstream side in the traveling direction D1, there is a risk of inhibiting uniformity of the discharging light. Specifically, in a case where light of a high intensity is applied from a position in the vicinity of the light source 141 on the curved surface 146 of the light guide member 142 and reaches the image formation region A1 of the photosensitive drum 11 on the upstream side in the traveling direction D1 of the intermediate transfer belt 5, there is a risk of inhibiting uniformity of the amount of discharge of the image formation region A1.

In view of this, the light guide member 142 has a light diffusing portion 148 at a position corresponding to a non-image formation region A2 that is outside of the image formation region A1 of the photosensitive drum 11. The light diffusing portion 148 is a convex portion having an arc-shaped cross section and being formed outward, and is formed on the opposing the transmitting/reflecting portions 147 in a part of a predetermined specific region corresponding to the non-image formation region A2 at one end or both ends of the light guide member 142 in the longitudinal direction. For example, the light diffusing portion 148 has a hemispherical shape. The light diffusing portion 148 may have a shape obtained by cutting a part of a sphere or a spheroid.

With the arrangement, light reflected by the light diffusing portion 148 of the light guide member 142 is applied as the discharging light L2 from the flat surface 145 to the end of the image formation region A1 of the photosensitive drum 11 on the downstream side in the traveling direction D1 of the intermediate transfer belt 5. It is therefore possible to compensate for the insufficiency of the amount of light at the end of the image formation region A1 of the photosensitive drum 11 on the downstream side in the traveling direction D1 of the intermediate transfer belt 5, thereby uniforming the amount of discharge.

Furthermore, since light that passes through the curved surface 146 from the light guide member 142 is diffused by the light diffusing portion 148, the amount of light that reaches, as the discharging light L1, the image formation region A2 of the photosensitive drum 11 on the upstream side of the traveling direction D1 in the intermediate transfer belt 5 is suppressed. It is therefore possible to uniform the amount of discharging light applied to the image formation region A1 of the photosensitive drum 11 on the upstream side in the traveling direction D1 of the intermediate transfer belt 5.

As illustrated in FIG. 2, a transparent or semi-transparent light-transmitting member 17 is provided as a cover member that covers a part or the entirety of the light source 141 and the light guide member 142 of the discharging portion 14. This prevents dust or toner from attaching to the light source 141 and the light guide member 142 of the discharging portion 14, thereby making it possible to prolong the life time of the image forming apparatus 10.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a plurality of image carriers arranged along a traveling direction of a transfer target member;

a developing roller configured to develop an electrostatic latent image formed on each image carrier as a toner image;

a transfer roller configured to transfer the toner image formed on each image carrier onto the transfer target member;

a cleaning portion configured to clean each image carrier after the toner image is transferred onto the transfer target member by the transfer roller;

a light source configured to emit light used to discharge each image carrier; and an elongated light guide member having a transmitting/reflecting portion and a convex portion, the transmitting/reflecting portion transmitting and reflecting light that is emitted from the light source, to enter one end of the light guide member in a longitudinal direction, and be guided to the other end of the light guide member so that the light is applied to: a position between the developing roller and the transfer roller on the image carrier on a downstream side in the traveling direction of the transfer target member; and a position between the transfer roller and the cleaning portion on the image carrier on an upstream side in the traveling direction of the transfer target member, the convex portion having an arc-shaped cross section and being formed outward at a position opposing the transmitting/reflecting portion in a part of a predetermined specific region at one end or both ends in the longitudinal direction, wherein the light guide member [is an elongated member that] has one flat surface having a plurality of the transmitting/reflecting portions.

2. The image forming apparatus according to claim 1, wherein the specific region is a region that corresponds to a non-image formation region of the image carrier.

3. The image forming apparatus according to claim 1, wherein the light guide member [is an elongated member that] has one flat surface having a plurality of the transmitting/reflecting portions formed along the longitudinal direction at predetermined intervals.

4. The image forming apparatus according to claim 3, wherein the transmitting/reflecting portions are inclined surfaces that are formed inwardly from the flat surface at a predetermined inclination angle.

5. The image forming apparatus according to claim 3, wherein the intervals of the transmitting/reflecting portions become shorter as a distance from the light source becomes longer.

6. The image forming apparatus according to claim 3, wherein the sizes of the transmitting/reflecting portions become larger as a distance from the light source becomes longer.

7. The image forming apparatus according to claim 1, further comprising a light-transmitting member that covers a part or the entirety of an outer periphery of the light guide member.

8. The image forming apparatus according to claim 1, wherein the image carrier disposed on a most upstream side in the traveling direction is an image carrier for yellow; and the light source and the light guide member are disposed only at positions on a downstream side of each image carrier in the traveling direction.

9. An elongated light guide member used in an image forming apparatus including: a plurality of image carriers arranged along a traveling direction of a transfer target member; a developing roller configured to develop an electrostatic latent image formed on each image carrier as a toner image; a transfer roller configured to transfer the toner image formed on each image carrier onto the transfer target member; a cleaning portion configured to clean each image carrier after the toner image is transferred onto the transfer target member by the transfer roller; and a light source configured to emit light used to discharge each image carrier, the light guide member having a transmitting/reflecting portion and a convex portion, the transmitting/reflecting portion transmitting and reflecting light that is emitted from the light source, to enter one end of the light guide member in a longitudinal direction, and be guided to the other end of the light guide member so that the light is applied to: a position between the developing roller and the transfer roller on the image carrier on a downstream side in the traveling direction of the transfer target member; and a position between the transfer roller and the cleaning portion on the image carrier on an upstream side in the traveling direction of the transfer target member, the convex portion having an arc-shaped cross section and being formed outward at a position opposing the transmitting/reflecting portion in a part of a predetermined specific region at one end or both ends in the longitudinal direction, the light guide member [being an elongated member that has] *having* one flat surface [having] *with* a plurality of the transmitting/reflecting portions.

*10. An image forming apparatus comprising:*

*a plurality of image carriers arranged along a traveling direction of a transfer target member;*

*a developing roller configured to develop an electrostatic latent image formed on each image carrier as a toner image;*

*a transfer roller configured to transfer the toner image formed on each image carrier onto the transfer target member;*

*a cleaning portion configured to clean each image carrier after the toner image is transferred onto the transfer target member by the transfer roller;*

*a light source configured to emit light used to discharge each image carrier; and*

*an elongated light guide member having a transmitting/reflecting portion, the transmitting/reflecting portion transmitting and reflecting light that is emitted from the light source, to enter one end of the light guide member in a longitudinal direction, and be guided to the other end of the light guide member so that the light is applied to: a position between the developing roller and the transfer roller on the image carrier on a downstream side in the traveling direction of the transfer target member; and a position between the transfer roller and the cleaning portion on the image carrier on an upstream side in the traveling direction of the transfer target member, wherein*

*the light guide member has one flat surface having a plurality of the transmitting/reflecting portions.*

*11. An elongated light guide member used in an image forming apparatus including: a plurality of image carriers arranged along a traveling direction of a transfer target member; a developing roller configured to develop an electrostatic latent image formed on each image carrier as a toner image; a transfer roller configured to transfer the toner image formed on each image carrier onto the transfer target member; a cleaning portion configured to clean each image carrier after the toner image is transferred onto the transfer target member by the transfer roller; and a light source configured to emit light used to discharge each image carrier,*

*the light guide member having a transmitting/reflecting portion, the transmitting/reflecting portion transmitting and reflecting light that is emitted from the light source, to enter one end of the light guide member in a longitudinal direction, and be guided to the other end of the light guide member so that the light is applied to: a position between the developing roller and the transfer roller on the image carrier on a downstream side in the traveling direction of the transfer target member; and a position between the transfer roller and the cleaning portion on the image carrier on an upstream side in the traveling direction of the transfer target member, the light guide member having one flat surface with a plurality of the transmitting/reflecting portions.*

*12. An image forming unit comprising:*

*a first image carrier;*

*a developing roller configured to develop an electrostatic latent image formed on the first image carrier as a toner image;*

*a first transfer roller configured to transfer the toner image formed on the first image carrier onto a transfer target member;*

*a cleaning portion configured to clean the first image carrier after the toner image is transferred onto the transfer target member by the first transfer roller;*

*a light source configured to emit light used to discharge the first image carrier; and*

*an elongated light guide member having a transmitting/reflecting portion, the transmitting/reflecting portion transmitting and reflecting light that is emitted from the light source, to enter one end of the light guide member in a longitudinal direction, and be guided to the other end of the light guide member so that the light is applied to: a position between the developing roller and the first transfer roller on the first image carrier; and a position between a second transfer roller and a second cleaning portion on a second image carrier of another image forming unit disposed on an upstream side in a traveling direction of the transfer target member, the light guide member having one flat surface with a plurality of the transmitting/reflecting portions.*

* * * * *